United States Patent [19]

Keiser

[11] Patent Number: 4,612,138
[45] Date of Patent: Sep. 16, 1986

[54] STABLE ACIDIC AND ALKALINE METAL OXIDE SOLS

[75] Inventor: Bruce A. Keiser, Naperville, Ill.

[73] Assignee: Nalco Chemical Company, Oak Brook, Ill.

[21] Appl. No.: 520,390

[22] Filed: Aug. 4, 1983

[51] Int. Cl.[4] .................. C04B 35/26; B01J 13/00
[52] U.S. Cl. ..................... 252/313.2; 252/634; 252/62.59; 106/287.34
[58] Field of Search .............. 252/313 R, 634, 313.2, 252/62.59; 106/287.34

[56] References Cited

U.S. PATENT DOCUMENTS

| | | | |
|---|---|---|---|
| 2,085,129 | 6/1937 | Stoewener | 252/313 X |
| 2,438,230 | 3/1958 | Ryznar | 252/313 |
| 2,984,628 | 5/1961 | Alexander | 252/313 |
| 3,024,199 | 3/1962 | Pasfield | 252/313 |
| 3,098,044 | 7/1963 | Glover | 252/313 |
| 3,139,406 | 6/1964 | Mindick et al. | 252/313 |
| 3,256,204 | 6/1966 | O'Connor | 252/301.1 |
| 3,442,817 | 5/1969 | Luebke | 252/313 |
| 3,462,373 | 8/1969 | Jongkind | 252/313 |
| 3,655,578 | 4/1972 | Yates | 252/313 |
| 3,657,003 | 4/1972 | Kenney | 117/120 |
| 3,676,362 | 7/1972 | Yates | 252/309 |
| 3,718,584 | 2/1973 | Beste et al. | 252/8.1 |
| 3,776,987 | 12/1973 | Grimes et al. | 264/0.5 |
| 4,028,266 | 6/1977 | Langere et al. | 252/313 |
| 4,065,544 | 12/1977 | Hamling et al. | 423/252 |
| 4,261,747 | 4/1981 | Feldstein | 106/1.11 |

OTHER PUBLICATIONS

Non-Ionic Surfactants, Griffin, The American Perfumer, May 1955, pp. 26–29.

Primary Examiner—Edward A. Miller
Assistant Examiner—Catherine S. Kilby
Attorney, Agent, or Firm—John G. Premo; Donald G. Epple

[57] ABSTRACT

A stable acidic and alkaline metal oxide sol is formed by hydrolyzing a metal salt precursor in the presence of a stabilizing component chosen from the group consisting of surfactants having an HLB of at least 8, dispersing carboxylate polymers, and mixtures thereof, then alkalizing by adding a water-soluble amine compound, preferably diethylaminoethanol.

11 Claims, No Drawings

STABLE ACIDIC AND ALKALINE METAL OXIDE SOLS

INTRODUCTION

It has been previously known to place metal oxide coatings on silica sols. These alleged coated sols are useful in a variety of applications. A well-known metal oxide coated silica sol is the so-called titania coated silica sol. A method of preparing such sols is disclosed in U.S. Pat. No. 3,244,639.

Titanium coated silica sols also have been prepared by batch addition of a bicarbonate form anion exchange resin to a mixture of titanium chloride and deionized silica sols. This procedure generates a gelatinous white precipitate which must be discarded while use is made of the supernatent. In addition, the handling of the bicarbonate form anion resin is difficult due to foaming and filtration problems. Finally, careful monitoring of solution pH and conductance are required to prevent instantaneous gelation. Unfortunately, even with these carefully monitored parameters, the sols will gel within 3–4 days.

Another metal oxide used to coat silica sols is aluminum oxide. Such alumina coated sols are described in several publications, one of which is U.S. Pat. No. 3,007,878. Other than coatings of titania and alumina on silica, little, if any, can be found in the literature dealing with silica sols combined with such metal oxide sols as, for example, tin, iron, zirconium, tungsten, cobalt, nickel, and the like.

In addition to the metal oxide coated silica sols mentioned above, certain other technologies exist which lead to metal oxide sols in the absence of any silica base material. These metal oxide sols are represented by the materials taught in U.S. Pat. No. 3,198,743 and U.S. Pat. No. 3,462,373. The teachings of U.S. Pat. No. 3,462,373 deal only with the preparation of tin oxide sols from metal stannates. These sols are taught to be interchangeable with the stannate form and seem to require a precipitation and redispersion before these materials are made alkaline stable.

The teachings of U.S. Pat. No. 3,198,743 include the preparation of ferric oxide sols using an amine to neutralize the acid chloride formed during the hydrolysis of the iron chloride precursor salts. These ferric oxide sols still require neutral or acidic pH's to remain stable.

The alleged silica coated with titania or alumina, described in various patent publications, are shown to be stable only in an acidic environment, or in the case of alumina, at acidic pH and then again at pH's which exceed 9.0. Even the alumina coated silica sols are not stable at pH's between about 5.0 and 9.0. When the pH of these acid sol materials is adjusted to the alkaline side, gellation or precipitation occurs. Similarly, the alleged coatings placed on the particles of colloidal silica are not truly adherent coatings since, when subjected to ultrafiltration, the majority of the metal oxide alleged to be coated on the silica is readily removed.

Most of the metal oxide sols of the prior art also require that acid pH's be maintained to achieve long term stability. In addition, these metal oxide sols are normally of relatively low concentration, a requirement since normally the metal oxide sols gel or precipitate when concentrated.

By using the practices of the present invention, it is possible to produce sols from a variety of metal oxides which are relatively concentrated and are stable in both the acid and, for the first time in most cases, in alkaline pH ranges.

THE INVENTION

The invention comprises a stable acidic metal oxide sol which contains from 1–50 weight percent $M_xO_y$ wherein:

M is chosen from the group consisting of alkaline earth metals and transition metals;

x is from 1–3;

y is from 1–6; and a water-soluble stabilizing component chosen from the group consisting of water-soluble surfactants having an HLB greater than about 8.0, a water-soluble dispersing carboxylate polymer, and mixtures thereof, with the ratio of metal oxide to stabilizing component being within the range of 0.25 to 1 to about 20 to 1.

The stable acidic metal oxide sols are preferably formed using water-soluble stabilizing components which are water-soluble dispersing carboxylate polymers, anionic surfactants, and mixtures thereof.

The stable acidic metal oxide sols are primarily those which contain berylium, magnesium, calcium, strontium, and barium, that is, those metal oxide sols wherein the metal is an alkaline earth metal.

These stable acidic metal oxide sols may also be formed from metals such as aluminum, tin, antimony, and those metals contained in the first two full horizontal rows of the periodic table. Illustrative of these metals are titanium, vanadium, chromium, manganese, iron, cobalt, nickel, copper, and zinc. In addition, other metals are capable of being used in the formation of the metal oxide sols of this invention. These metals include zirconium, molybdenum, lead, silver, platinum, mercury, and palladium.

A preferred group of metals used to form the acidic metal oxide sols of this invention are titanium, iron, tin, zirconium, aluminum, and molybdenum. The compounds of these metals used to prepare the acid stable metal oxide sols should be capable of undergoing hydrolysis in acidic aqueous environments. In most instances, the mineral acid anion salts of these compounds may be employed, thus, in the case of titanium, titanium tetrachloride is an ideal starting material. Rather than using the anhydrous inorganic salts of the metal oxide, it is possible to utilize organo metallic species of these metals which are capable of hydrolyzing in acidified water to produce the corresponding oxide.

Further illustrative of starting compounds are tin tetrachloride, ferric nitrate, and the like. Other suitable compounds of these metals that may be used to prepare the finished compositions of the invention are described in the text, *The Hydrous Oxides*, by Weiser, McGraw-Hill Book Co., Inc., New York, N.Y., 1926.

Also included in this invention is a stable alkaline metal oxide sol containing from 1–50 weight percent $M_xO_y$ wherein:

M is chosen from the group consisting of alkaline earth metals and transition metals;

x is from 1–3;

y is from 1–6; and a water-soluble stabilizing component chosen from the group consisting of water-soluble surfactants having an HLB greater than about 8.0, water-soluble dispersing carboxylate polymers and mixtures thereof, with the ratio of metal oxide to stabilizing component being within the range of 0.25:1 to about 20:1 and the pH of the alkaline metal oxide sol being produced by a water-soluble amine.

The preferred water-soluble stabilizing component used to form the stable alkaline metal oxide sols is a water-soluble dispersing carboxylate polymer, an anionic surfactant having an HLB greater than 8, or mixtures thereof. In addition, these alkaline metal oxide sols may be formed by using a nonionic surfactant having an HLB greater than about 8 in combination with the anionic water-soluble dispersing carboxylate polymers mentioned above and described in detail below.

The Water-Soluble Surfactants

The water-soluble stabilizing components used to form both the acidic metal oxide sols and the alkaline metal oxide sols of this invention are normally water-soluble surfactants having an HLB greater than about 8. These water-soluble surfactants may be anionic, when used alone or in combination with dispersing carboxylate polymers, or may be nonionic when used in combination with the water-soluble dispersing carboxylate polymers to be described. The water-soluble surfactants may be represented, but not limited to, the chemicals listed in Table I. Table I does not contain any cationic surfactants since tests with cationic materials which are surfactants having an HLB greater than 8 have indicated that these cationic materials do not function to form either the stable acidic metal oxide sols or the stable alkaline metal oxide sols of this invention.

TABLE I

| Composition | Ingredients | % Active |
|---|---|---|
| Comp. 1 | Condensed naphthalene sulfonate, sodium salt | 98.0 |
| Comp. 2 | Ammonium salt of xylene sulfonate | 46.0 |
| Comp. 3 | Ammonium salt of xylene sulfonate | 46.0 |
| Comp. 4 | non-ionic (polyol) condensate of ethylene oxide with hydrophobic bases (propylene oxide with propylene glycol) | ~100 |
| Comp. 5 | non-ionic polyethoxylated straight chain alcohol | ~100 |
| Comp. 6 | tris cyanoethyl cocodiamine | ~100 |

When the nonionic dispersants above are used in this invention, it is preferred that they are used in combination with the water-soluble dispersing carboxylate polymers to be described.

Water-Soluble Dispersing Carboxylate Polymers

These materials are water-soluble polymers which contain carboxylic acid or carboxylic acid salt functional groups. They include the water-soluble homopolymers and copolymers of such monomers as acrylic acid, methacrylic acid, maleic anhydride, itaconic acid, and the like. The preferred water-soluble dispersing carboxylate polymers normally have a molecular weight between about 1000–500,000. Preferably their molecular weight is between about 2500–50,000. Most preferably, these water-soluble dispersing carboxylate polymers have a molecular weight between 5000–25,000.

The carboxylic acid functional group are pendent to the polymer backbone and can be represented by the formula

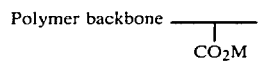

where M is chosen from hydrogen, lithium, sodium, potassium, ammonium, and the like.

The water-soluble dispersing carboxylate polymers of this invention may be represented, but are not limited to, those chemicals listed in Table II.

TABLE II

| Polymer | | Average Mol. Wt. |
|---|---|---|
| 1 | 3:1 acrylic acid/hydroxypropyl-acrylate copolymer | 4942 |
| 2 | 4:1 acrylic acid/ethylacrylate copolymer | 2000 |
| 3 | 4:1 acrylic acid/methylacrylate copolymer | 2500 |
| 4 | polyacrylic acid | 2600 |
| 5 | 3:1 acrylamide/acrylic acid copolymer | 9000 |
| 6 | 2:1 acrylic acid/acrylamide copolymer | 20,000 |
| 7 | acrylic acid, homopolymer | 6000 |
| 8 | maleic acid, homopolymer | 800–1000 |
| 9 | maleic acid, homopolymer | 800–1000 |
| 10 | acrylic acid, homopolymer with isopropanol content | 3260 |
| 11 | acrylic acid, homopolymer | 3150 |

The function of the water-soluble stabilizing component is to prevent precipitation and gellation of the metal oxide sols uring their formation and subsequent processing steps. The stabilizing components are normally chosen from the group consisting of the nonionic and anionic water-soluble surfactants having an HLB greater than about 8, the water-soluble dispersing carboxylate polymers, or mixtures thereof. The ratios of metal oxide to stabilizing component within the acid stable metal oxide sols is normally within the range of about 0.25:1 to about 20:1. The use of these stabilizing components add additional stability to the final acid sols and also provide additional stability to acid sols which have been rendered alkaline by the addition of water-soluble amines. The particular amount of water-soluble stabilizing component required to stabilize the metal oxide sols, either acidic or alkaline, may be readily determined by routine experiments. It is important to note that these water-soluble stabilizing components may include the surfactants described above, the dispersing carboxylate polymers described above, and any mixtures of these materials. Again, routine experiments may determine those mixtures which produce improved stable acidic or alkaline metal oxide sols.

Synthesis of the Acidic Sol

To illustrate the synthesis of the acidic sols of this invention, the following examples are given.

EXAMPLE 1

A pure titanium oxide sol is prepared by adding anhydrous titanium chloride to water which contains two dispersants, Comp. 2 (see Table I for description), and Polymer 1 (see Table II for description). 171 gm of Comp. 2 and 36.8 gm of Polymer 1 were dissolved in 100 gm water. This solution was chilled to 5° C. Anhydrous titanium tetrachloride was added dropwise to this chilled solution maintaining temperatures between 10°–15° C. A total of 160 gm of technical grade anhydrous titanium chloride was added.

After complete addition of this titanium salt, the solution mixture was gradually heated to 65° C. and maintained at that temperature for about 1 minute to assure complete hydrolysis to $TiO_2$. The solution was then cooled in air and diluted with D.I. water to approximately 2.5% solids. This material was then diafiltered through an ultrafiltration membrane until 4 equivalent volumes of permeate was removed. The retentate had a pH of 2.3, a conductance of about 2000 umhos/cm, and retained all of the titanium metal oxide sol. This material was stable for an extended period of time.

EXAMPLE 2

Another pure titanium oxide sol was synthesized using essentially the same technique as in Example 1 but utilizing as the stabilizing component a mixture of Comp. 2 and Polymer 4. The titanium dioxide to Comp. 2 ratio was 2.13, and the titanium dioxide to Polymer 4 ratio was 13.6. Again, these stabilizing component materials were dissolved in water by adding 8 gm of Comp. 2 and 2 gm of Polymer 4 to 100 gm water. This solution was cooled to about 10° C. and maintained at that temperature during the addition of 16 gm anhydrous titanium tetrachloride. After complete addition and hydrolysis of the titanium tetrachloride salt, the mixture was heated to 80° C. and allowed to cool to about 65° C. The solution was then reheated to about 95° C. prior to dilution with distilled water to a total solids concentration of 3 weight percent. This diluted material was ultrafiltered to remove 3 equivalent volumes of permeate. The retentate had a pH of 3.6 and a conductance of 197 umhos/cm. It contained the entire titanium values. The material was stable for extended periods of time.

EXAMPLE 3

The procedures of Example 1 and 2 were essentially followed using a combination of Comp. 2 and Polymer 5 as the stabilizing component. The ratio of titanium dioxide to Comp. 2 was 1.8, and the titanium dioxide to Polymer 5 ratio was 13.6. Temperature was used to control the rate of hydrolysis of anhydrous titanium chloride (123 gm, 0.65 moles) which was added to 1000 gm water containing 62 gm Comp. 2 and 13.8 gm Polymer 5 which had previously been cooled to a temperature of about 5° C. and maintained at that temperature during the addition of the titanium tetrachloride. Upon complete addition of the titanium salt, the mixture was heated to a temperature of 75° C. for about 10 minutes to complete the hydrolysis of titanium tetrachloride to form titanium dioxide. This mixture was air cooled to about 40° C., diluted to a final concentration containing about 2 weight percent solids and diafiltered to remove about 7 equivalent volumes of permeate. The resulting retentate had a pH of 2.7 and a conductance of 1048 umhos/cm. The product contained all of the titanium added and was stable for an extended period of time.

EXAMPLE 4

A pure titanium oxide sol was prepared by hydrolysis of an organotitanate in the presence of Polymer 8 and Comp. 2. The ratio of titanium dioxide to Comp. 2 was 2.5 while the titanium dioxide to Polymer 8 ratio was 11.0. The organotitanate used was tetrapropyl titanate (10 gm calculated as titanium oxide) in 20 gm of glacial acidic acid.

0.8 gm of Polymer 8 and 2.3 gm of Comp. 2 were dissolved in 70 gm water. The tetrapropyl titanate dissolved in glacial acidic acid was then added to the solution containing the stabilizing components above. The addition was done dropwise with good mixing and continued until hydrolysis of the tetrapropyl titanate was complete. The resulting solution mixture was further diluted to approximately 1–2 weight percent and ultrafiltered until about 4 equivalent volumes of permeate was removed. The final retentate had a final pH of 3.1 and a conductance of 480 umhos/cm. This titanium oxide sol contained all of the titanium values originally added and was stable for an extended period of time.

EXAMPLE 5

A pure titanium oxide sol was prepared using procedures similar to those of Example 4 but substituting tetrabutyl titanate for the tetrapropyl titanate of Example 4. The ratios of titanium dioxide to Polymer 8 and to Comp. 2 were 7.0 and 2.5 respectively. The tetrabutyl titanate was added to 20 gm of glacial acidic acid to form a solution containing 10 gm of titanium oxide. The Polymer 8 (0.8 gm) and Comp. 2 (2.3 gm) were again dissolved in 70 gm water. The glacial acidic acid solution of titanium was added dropwise until complete addition and hydrolysis to form titanium oxide sols was achieved. This mixture was ultrafiltered without any further dilution with water. The ultrafiltration removed about 10 equivalent volumes of permeate. The resulting retentate had a pH of 3.2, a conductance of 85 umhos/cm. and contained all of the titanium values initially used. This titania sol was stable for extended periods of time.

EXAMPLE 6

A pure iron sol was prepared using an hydrated ferric nitrate raw material. Again, a stabilizing component composed of Polymer 3 and Comp. 2 was used to stabilize the ferric oxide sol during its formation. The ferric oxide to Polymer 3 ratio was 3.33, and the ferric oxide to Comp. 2 ratio was 3.34. 23.3 gm of hydrated ferric nitrate was dispersed in 50 gm water and heated to 60° C. 5 gm of Polymer 3 and 6 gm Comp. 2 were added to 75 gm water. The solution containing the stabilizing components was then added dropwise to the ferric nitrate solution while maintaining the temperature at 60° C. After completing the addition of the stabilizing component solution, the reactant solution was cooled, diluted to approximately 2 weight percent solids by the addition of D.I. water, and ultrafiltered. Ultrafiltration was completed with the removal of about 20 equivalent volumes of permeate. The retentate had a pH of 4.1 and a conductance of 20.11 umhos/cm.

EXAMPLE 7

A stable acid iron oxide sol was prepared using hydrated ferric nitrate, Polymer 2, and Comp. 2. The ferric acid to Polymer 2 ratio was 3.33, and the ferric oxide to Comp. 2 ratio was 3.84. Again, the solution containing the Polymer 2 and Comp. 2 was added to a heated solution of ferric nitrate. After complete hydrolysis of the ferric nitrate salt to form the ferric oxide sol in the presence of the stabilizing components, the solution mixture was diluted to about 2 weight percent total solids and ultrafiltered until 20 equivalent volumes of permeate was removed. The retentate had a pH of 5.5 and a conductance of 10.3 umhos/cm.

The iron oxide sol was stable for extended periods of time and contained all of the iron values originally used.

EXAMPLE 8

An iron oxide sol was prepared using ferric sulfate, nanohydrate, and a single component stabilizing compound, Polymer 5. The calculated ferric oxide to stabilizing component ratio was 1.5.

8.4 gm ferric sulfate nonohydrate was dissolved in 50 gm water. 4.6 gm of Polymer 5 was dissolved in 50 gm water. This second solution was added to the ferric sulfate solution after the ferric sulfate solution had been heated to 70° C. After complete addition of the stabilizing component solution, the reaction mixture was heated to 100° C. for 5 minutes, air cooled to 40° C., and directly ultrafiltered to remove about 17 equivalent volumes of permeate. The retentate thus formed had a pH of 3.4 and a conductance of 225 umhos/cm.

EXAMPLE 9

A stable pure acidic iron oxide sol was prepared using, again, the ferric sulfate nanohydrate solution and a single stabilizing carboxylate polymer, Polymer 6, at a ferric oxide to carboxylate polymer ratio of 1.5. The technique of Example 8 was again used by dissolving 8.4 gm of the ferric sulfate hydrate in 50 gm water, heating to 70° C. and simultaneously adding a solution containing 5.16 gm of Polymer 6 in 50 gm water while maintaining the ferric sulfate solution at 70° C. After complete addition of the stabilizing component solution, this mixture was heated to 100° C. for 5 minutes to insure the hydrolysis of the ferric sulfate to form the ferric oxide sol material The solution was cooled to 40° C., diluted to approximately 2 weight % with D.I. water, and ultrafiltered to remove about 7 equivalent volumes of permeate. The retentate contained the iron oxide sol which had a pH of 3.4 and a conductance of 247 umhos/cm.

EXAMPLE 10

A pure iron oxide sol was prepared from ferric chloride hexahydrate and Polymer 6 at a ratio of ferric oxide to Polymer 6 of 1.5. The ferric chloride hexahydrate (8.1 gm) was dissolved in 50 gm water and heated to 80° C. Simultaneously, 50 gm water was used to dissolve 5.16 gm of Polymer 6. The solution of Polymer 6 was added to the ferric chloride solution while temperatures were maintained at 80° C. The addition was done slowly and after it was completed, the mixture was heated to 100° C. and held there for 5 minutes before the mixture was finally air cooled to about 40° C. and diluted to about 3 weight percent solids using D.I. water. This diluted solution was ultrafiltered to remove approximately 11 equivalent volumes of permeate. The retentate formed had a pH of 3.8, a conductance of 113 umhos/cm, contained all of the iron values initially used, and was stable for an extended time period.

EXAMPLE 11

The pure tin oxide sol was prepared from anhydrous tin tetrachloride. Two dispersants were used to impart stability during and after manufacture. These dispersants were Polymer 8 and Comp. 2. The tin oxide to dispersant ratios were respectively 12.0 and 3.4.

The dispersants (Comp. 2, 4.4 gm and Polymer 8, 1 gm) were added to 70 gm of water. The resulting solution was then chilled to approximately 5° C. The anhydrous tin tetrachloride (10.5 gm, 0.04 moles) was added dropwise over 5 minutes to the chilled solution. Upon complete addition of the anhydrous tin tetrachloride, the reaction mixture was boiled at 100° C. for 5 minutes. This was followed by air cooling and diafiltration. The diafiltration process removed 7 equivalent volumes of permeate. The resulting retentate had a pH of 1.6 and a conductance of 12,000 umhos/cm.

EXAMPLE 12

The pure tin oxide sol was prepared from sodium stannate. Two dispersants were used during the sol preparation. The dispersants were Polymer 8 and Comp. 2. The tin oxide to dispersant ratios were respectively 10.0 and 2.58.

The sodium stannate (8.83 gm, 0.03 moles) was dissolved at 49° C. in 70 gm of water. The water previously had been treated with the Polymer 8 and the Comp. 2 (1 gm and 4.2 gm respectively). Once the sodium stannate had dissolved, the pH of the solution was adjusted to 10.0 with ammonium carbonate. A final pH adjustment was made to 8.0 with acetic acid. The reaction mixture was then diafiltered. The diafiltration process removed approximately 30 equivalent volumes of permeate.

EXAMPLE 13

The pure tin oxide was prepared from stannic chloride anhydrous. Two dispersants were used during the synthesis of the colloid. These dispersants were Comp. 3 and Polymer 8. The ratios of tin oxide to dispersant were respectively 1.7 and 5.7.

The dispersants (i.e., Polymer 8, 21 gm and Comp. 3, 76 gm) were dissolved in 1000 gm of water. This mixture was then chilled to approximately 5° C. At that point, the anhydrous stannic chloride (105 gm, 0.40 moles) was added dropwise. Upon omplete addition of the stannic chloride, the reaction mixture as warmed to 95° C. for 1 hour. After this, the reaction mixture as air cooled, diluted, and diafiltered. Approximately 1.5 equivalent volumes of permeate were removed by diafiltration. The retentate thus formed had a pH of 1.7 and a conductance greater than 20,000 umhos/cm.

EXAMPLE 14

The pure tin oxide sol was prepared from stannic chloride pentahydrate. Two dispersants were used to prepare the final product. The dispersants were Polymer 8 and Comp. 3. The tin oxide to dispersant ratios were respectively 10.2 and 3.0.

The stannic chloride pentahydrate (306 gm, 0.87 moles) was dissolved in 1000 gm of water. The Polymer 8 (26 gm) and Comp. 3 (96 gm) were then added to the stannic chloride solution. The resulting solution was heated to 90° C. Concentrated aqueous ammonium hydroxide (175.9 gm) was gradually added while maintaining a temperature of 90° C. Upon complete addition of the ammonium hydroxide (i.e., at a ratio of tin oxide to ammonium hydroxide of 0.75), the reaction mixture was maintained at 90° C. for 30 minutes. This was followed by air cooling and diafiltration. Diafiltration was carried out in three portions.

The first portion was diafiltered to remove two equivalent volumes of permeate. The resulting retentate had a pH of 2.8 and a conductance of 1330 umhos/cm. Diethylaminoethanol was used to adjust the pH to 10.8 and the alkalized retentate had a conductance of 1030 umhos/cm. This required a tin oxide to DEAE ratio of 1.83.

The second portion was diafiltered to remove approximately three equivalent volumes of permeate. The retentate thus formed had a pH of 3.2 and a conductance of 1420 umhos/cm. Addition of diethylaminoethanol to alkalize the retentate to a pH of 10.3 yielded a conductance of 1160 umhos/cm. This required a tin oxide to DEAE ratio of only 3.67.

The third portion of the reaction mixture was diafiltered removing 4 equivalent volumes of permeate. The resulting retentate had a pH of 3.2 and a conductance of 859 umhos/cm.

EXAMPLE 15

The pure tin oxide sol was prepared from stannic chloride pentahydrate. A single dispersant was used to impart stability during and after the preparation. The dispersant was Comp. 3. The ratio of stannic oxide to dispersant was 3.54.

The stannic chloride pentahydrate (281 gm, 0.80 moles) was dissolved in 956 gm of water. To this was added the Comp. 3 (85.5 gm) and the resulting mixture was heated to 60° C. Once the mixture had reached 60° C., concentrated ammonium hydroxide (70 gm) was added. This was a stannic oxide to ammonium hydroxide ratio of 0.82. The ammonium hydroxide was added in four equivalent aliquots with an interval of 2 minutes. This has been found to be the optimum rate of addition of the aqueous ammonium hydroxide. The resulting reaction mixture was then added to 2300 gm of water and mixed thoroughly. After the dilution, the mixture was allowed to stand for 1 hour. During this time, a floc formed and settled. The supernatant was decanted. This procedure was repeated four times with the resulting retentates having the following pH and conductance values at the various stages:

| Decantation # | Retentate pH | Retantate Conductance |
|---|---|---|
| 1 | 2.0 | 19,000 umhos/cm |
| 2 | 2.2 | 8,780 umhos/cm |
| 3 | 2.5 | 4,150 umhos/cm |
| 4 | 2.6 | 2.650 umhos/cm |

EXAMPLE 16

The pure zirconium oxide solution was prepared from zirconium acetate solution (25% active). Additionally, a single dispersant was used for stabilization. This dispersant was Polymer 2. The zirconium oxide to dispersant ratio was 7.9.

The zirconium acetate solution (10 gm of a 25% active solution) was diluted with water (40 gm). To this solution was added 3 gm of concentrated aqueous nitric acid. The ratio of zirconium oxide to concentrated aqueous nitric acid was 0.83. The dispersant (Polymer 2, 1.5 gm) was diluted with 50 gm of water. This latter solution was added to the zirconium acetate solution in a dropwise manner. The mixture was then heated to 100° C. for approximately 15 minutes. During this time, the reaction mixture gradually developed a blue opalescent haze. This material then was air cooled to room temperature and diafiltered. The diafiltration process removed approximately 17 equivalent volumes of permeate. The retentate thus formed had a pH of 4.0 and a conductance of 181 umhos/cm. This material is a stable, blue opalescent sol. Attempts to adjust or to alkalize this sol resulted in gellation and/or settling of the zirconium oxide.

EXAMPLE 17

The pure zirconium oxide sol was prepared from the zirconium acetate solution (a 25% active). A single dispersant was used to stabilize the colloidal zirconium oxide sol. The dispersant was Polymer 2. The zirconium oxide to dispersant ratio was 7.9.

The zirconium acetate solution (10 gm of a 25% active solution) was diluted with water (40 gm). Concentrated aqueous nitric acid (3 gm) was added to this solution. The zirconium oxide to aqueous concentrated nitric acid ratio was 0.83. Simultaneously, the dispersant (1.5 gm of Polymer 2) was diluted with water (50 gm). The dilute dispersant solution was added to the zirconium acetate containing solution in a dropwise manner at room temperature. Upon complete addition of the dispersant solution, the reaction mixture was then heated to 100° C. for 1 hour after which time the reaction mixture was cooled to room temperature and diluted for diafiltration. Diafiltration removed approximately 17 equivalent volumes of permeate. The retentate thus formed was a stable, colloidal zirconium oxide sol with a blue opalescent appearance. The retentate had a pH of 3.3 and a conductance of 594 umhos/cm.

EXAMPLE 18

The pure zirconium oxide sol was prepared from a solution of zirconium acetate (25% active). A single dispersant was used to stabilize the pure zirconium oxide sol. The dispersant used was Polymer 7. The zirconium oxide to dispersant ratio was 8.5. Concentrated aqueous nitric acid was also used in the synthesis of this sol. The zirconium oxide to concentrated aqueous nitric acid ratio was 1.7.

The zirconium acetate solution (10 gm of the 25% active solution) was diluted with 80 gm of water. To this was added 1.5 grams of aqueous concentrated nitric acid. (This is at a zirconium oxide to aqueous concentrated nitric acid of 1.7.) The dispersant (Polymer 7, 1 gm) was diluted with 20 gm of water and added to the dilute zirconium acetate solution. Upon addition, the mixture immediately turned a bluish-white in appearance. The reaction mixture was heated to 75° C. for 5 minutes. After heating, it was cooled to room temperature and diluted for diafiltration. The diafiltration removed 18 equivalent volumes of permeate. The resulting retentate had a pH of 4.0 and a conductance of 257 umhos/cm. The retentate was a stable, blue opalescent zirconium oxide sol.

EXAMPLE 19

The pure zirconium oxide was prepared from zirconium acetate solution (a 25% active solution). Nitric acid was also used along with Polymer 2 for stabilization. The zirconium oxide to aqueous concentrated nitric acid ratio was 0.5. In a similar manner, the zirconium oxide to dispersant ratio was 4.76.

The zirconium acetate solution (20 gm of 25% active) was diluted with 80 gm of water. To this solution was added 10 gm of concentrated aqueous nitric acid (i.e., a zirconium oxide to nitric acid ratio of 0.5). Simultaneously, the dispersant (Polymer 2, 5 gm) was diluted with 30 gm of water. The dilute dispersant solution was added to the zirconium acetate solution. Upon complete addition of the dispersant, the solution had the appearance of a clear, blue opalescent solution. The mixture was then heated for 15 minutes at 98° C. followed by air cooling and finally dilution and diafiltration. The diafiltration removed 13 equivalent volumes of permeate. The retentate thus formed had a pH of 3.5 and a conductance of 309 umhos/cm. The retentate was stable with a white-blue appearance.

EXAMPLE 20

The pure zirconium oxide sol was prepared from a zirconium acetate solution (25% actives). A single dispersant was used to stabilize the resulting sol. This dispersant was Polymer 2. The zirconium oxide to dispersant level was 7.93. Concentrated aqueous nitric acid was also used in the preparation of this sol and was used at a ratio of zirconium oxide to aqueous concentrated nitric acid of 0.5.

The zirconium acetate solution (20 gm of 25% active solution) was diluted with 80 gm of water. To this was added 10 gm of concentrated aqueous nitric acid (i.e., at a zirconium oxide to nitric acid ratio of 0.5). A second solution was prepared from Polymer 2 (3 gm) and 27 gm of water. The second solution was added to the zirconium acetate solution, and the resulting reaction mixture was heated to 100° C. for 10 minutes. After this treatment, the reaction mixture was air cooled to 40° C. and diluted to approximately 2% solids. This solution was diafiltered to remove approximately 11 equivalent volumes of permeate. The retentate thus formed had a blue opalescent appearance and a pH of 3.4. The conductance of the final sol was 664 umhos/cm.

EXAMPLE 21

The pure zirconium oxide sol was prepared from zirconium acetate solution (25% active). This experiment evaluated the effect of the zirconium oxide to Polymer 2 ratio, as well as the effect of the ratio of zirconium oxide to concentrated aqueous nitric acid.

Five experiments were undertaken initially to examine the affect of stability towards the treatment with the dispersant and the concentrated aqueous nitric acid. The physical nature of the resulting mixtures was used to screen potentially useful formulations. All the formulations were prepared in the following manner:

Zirconium acetate solution (10 gm of a 25% active solution) was diluted with 70 gm of water. To this solution was added the appropriate amount of concentrated aqueous nitric acid. This was followed by a dilute Polymer 2 solution prepared from the appropriate amount of dispersant and 20 grams of water.

| Experiment Number | Zirconium Oxide: Dispersant Ratio | Zirconium Oxide: Nitric Acid Ratio | Reaction Mixture Appearance |
|---|---|---|---|
| 1 | 14.9 | 2.5 | Large particle sol |
| 2 | 10.0 | 2.5 | Large particle sol |
| 3 | 10.0 | 1.25 | Intermediate particle size |
| 4 | 11.9 | 0.83 | Medium particle size |
| 5 | 11.9 | 0.63 | Small particle size |

Only experiments 4 and 5 were evaluated further. Both experiment 4 and 5 were heated to 100° C. for 15 minutes, air cooled, diluted, and diafiltered. Sample 4 was diafiltered to remove 13 equivalent volumes of permeate. This yielded a retentate with a pH of 3.8 and a conductance of 360 umhos/cm. The retentate was a stable colloidal zirconium oxide sol of approximately 3% by weight zirconium oxide. Experiment 5 was diafiltered to remove 15 equivalent volumes of permeate. The resulting sol was clear in appearance with a pH of 4.0 and a conductance of 206 umhos/cm. This zirconium oxide sol was also stable at about 3% total solids.

EXAMPLE 22

The pure zirconium oxide sol was prepared from a 25% zirconium acetate solution. The resulting sol was stabilized utilizing a single dispersant, Polymer 2. The ratio of zirconium oxide to dispersant was 10.2

The zirconium acetate (429 gm of 25% active) was diluted with 1700 gm of water. To this solution was added concentrated aqueous nitric acid (250 gm at a ratio of zirconium oxide to nitric acid of 0.43). Finally, a dilute solution of dispersant was prepared containing 50 gm Polymer 2 and 579 gm of water. This latter solution was then added to the dilute zirconium acetate solution. The reaction mixture was heated to 90° C. for 1 hour. This was followed by air cooling to room temperature and diafiltration. The diafiltration process removed 3 equivalent volumes of permeate. The resulting retentate had a pH of 2.4 and a conductance of 3310 umhos/cm. The retentate thus formed was concentrated to approximately 7.5% solids with a pH of 2.3 and a conductance of 5089 umhos/cm.

EXAMPLE 23

The pure zirconium oxide sol was prepared from a 25% solution of zirconium acetate. A single dispersant was used to impart stability to the resulting colloidal zirconium oxide. The dispersant was Polymer 2. The ratio of zirconium oxide to dispersant was maintained at 12.7.

The zirconium acetate (429 gm of 25% active) was diluted with 1700 gm of water. In the meantime, the dispersant (Polymer 2, 40 gm) was diluted with 580 gm of water. Concentrated aqueous nitric acid (280 gm) was added to the diluted zirconium acetate solution prior to the addition of the diluted Polymer 2 solution. Upon complete addition of the Polymer 2 solution, the reaction mixture was a light blue opalescence appearance and was heated to 100° C. for 1 hour. This was followed by air cooling to 40° C. The resulting mixture was diafiltered to remove 11 equivalent volumes of permeate. At this point, the retentate had a pH of 2.4 and a conductance of 2010 umhos/cm. The sol was then concentrated to approximately 7.2% total solids with a resulting pH of 2.0 and a conductance of 6470 umhos/cm.

The metal oxide sols formed above may also be treated to minimize corrosivity since some of the acid sols formed with these metals and other metals may be corrosive because of the low pH of these systems. The metal oxide sols above and those subsequently shown may be alkalized to prevent corrosivity by adjusting the pH to at least 8.0, preferably within the range of 8.5–12.5 and, most preferably, within the range of 9.0–11.5. The pH adjustment required to achieve the alkaline stable metal oxide sols can only be achieved using water-soluble amines. While most water-soluble amines may be used, it is preferred to use those water-soluble amines which contain a polar group in addition to the amino group of these compounds. Thus, amino compounds containing hydroxyl groups, one or more amino groups, oxygen groups, and the like are preferred. A most preferred group of amines are the compounds, diethylaminoethanol, ethylenediamine, ethanolamine, and aminoethylethanolamine, with diethylaminoethanol being the preferred species.

Illustrative of other water-soluble amines that may be used are the following: methylamine, dimethylamine, trimethylamine, ethylamine, diethylamine, triethylamine, n-propylamine, di-n-propylamine, tri-n-propylamine, n-butylamine, n-amylamine, trimethylenediamine, tetramethylenediamine, pentamethylenediamine, hexamethylenetetramine, hexamethylenediamine, and the like.

To further demonstrate that these metal oxide sols may be synthesized and stabilized by the addition of these water-soluble amines, the following examples are given:

EXAMPLE 24

The sol formed in Example 1 was alkalized by adding diethylamino ethanol to the retentate to achieve a pH of 10.2. The resulting conductance was 4800 umhos/cm. The sol was indefinitely stable.

EXAMPLE 25

The titanium oxide sol of Example 2 was alkalized by adding diethylaminoethanol to the retentate to achieve a pH of 10.2 and a titanium oxide sol having a conductance of 1500 umhos/cm and being indefinitely stable.

EXAMPLE 26

The titanium oxide sol of Example 3 was stabilized by adding diethylaminoethanol to the retentate to achieve a pH of 10.2 and a conductance of 1230 umhos/cm. The resulting colloid was concentrated to 5.04% total solids which gave a final product having a pH of 9.5 and a conductance of 2680 umhos/cm.

EXAMPLE 27

Each of the titanium oxide sols, the iron oxide sols in the examples above, can be stabilized by adding diethylaminoethanol to the retentate to alkalize this solution to a pH of 8 or above, preferably 9.0–12.5. The addition of this amine compound always yields an indefinitely stable metal oxide sol having a final pH within the range of 8.5–12.5.

Other metal oxide sols may be formed and stabilized by the addition of water-soluble amines. To exemplify these stabilized metal oxide sols, the following examples are presented:

EXAMPLE 28

The pure aluminum oxide sol was prepared from aluminum sulfate, reagent grade. A single dispersant was used to impart stability. This dispersant was Polymer 11. The aluminum oxide to dispersant ratio was 0.11.

The aluminum sulfate (5.4 gm, 0.008 moles) was dissolved in 59.6 gm of water. To this was added 15 gm of the dispersant. Following the addition of the dispersant, diethylaminoethanol was added to alkalize the solution. Upon complete addition of the diethylaminoethanol, the reaction mixture was heated to 100° C. for 15 minutes. The mixture was then air cooled and diluted. Diafiltration continued with the removal of 17 equivalent volumes of permeate. The resulting retentate had a pH of 7.9 and a conductance of 3130 umhos/cm. The retentate had a total solids of 2.4% as aluminum oxide, and the aluminum oxide particles were between 2 and 4 nm in size.

EXAMPLE 29

The pure aluminum oxide sol was prepared from aluminum sulfate. A single dispersant was used during and after the sol preparation. The dispersant was Polymer 8. The aluminum oxide to dispersant ratio was 0.04.

The aluminum sulfate (2.0 gm, 0.003 moles) was dissolved in 63 gm of distilled water. The dispersant (15 gm) was added once the aluminum sulfate had dissolved. The resulting mixture exhibited an increase in viscosity. Diethylaminoethanol (20 gm) was introduced thus lowering the viscosity. Upon complete addition of the diethylaminoethanol, the mixture was heated to 100° C. for 15 minutes. At this point, the mixture had approximately 0.4% aluminum oxide, a pH of 9.5, and a conductance of 17,600 umhos/cm. The mixture was air cooled and diafiltered. The diafiltration process removed 10 equivalent volumes of permeate. The resulting retentate had a pH of 8.1 and a conductance of 2650 umhos/cm. The particle diameter was approximately 4 nm. Total solids were 1.6% as aluminum trioxide.

EXAMPLE 30

The pure molybdenum oxide sol was prepared from molybdenum pentachloride anhydrous. Two dispersants were used to impart stability to the final product. The dispersants were Polymer 8 and Comp. 3. The ratios of molybdenum oxide to dispersant were respectively 17.72 and 4.8.

The anhydrous molybdenum pentachloride (44.3 gm, 0.16 moles) was added to 500 gm of water. The addition of the anhydrous pentachloride was done with great caution due to the exothermic nature of the hydrolysis of this material. With complete dissolution of the molybdenum pentachloride, the dispersants (Polymer 8, 5 gm, and Comp. 3, 20 gm) were added to the solution mixture. This initial solution was subdivided into the following portions.

One hundred twenty grams of the above solution (i.e., 24%) was adjusted with aqueous concentrated ammonium hydroxide to a pH of 5.0. This required 11.8 gm of concentrated aqueous ammonium hydroxide (i.e., a ratio of molybdenum oxide to ammonium hydroxide of 0.93). At this point, the solution was divided into two parts. The first part was heated to 100° C. for 2 minutes and then air cooled and diafiltered. The diafiltration process removed 5 equivalent volumes of permeate. The resulting retentate had a pH of 5.2 and a conductance of 1864 umhos/cm. Diethylaminoethanol was used to stabilize the retentate at pH 10.0. The resulting conductance was 2930 umhos/cm. The second part was diluted and diafiltered without heating. The diafiltration removed 11.5 equivalent volumes of permeate. The retentate pH was 5.0 and the conductance was 1069 umhos/cm. Again, diethylaminoethanol was used to alkalize the pH to 10.0 with the resulting conductance of 2330 umhos/cm. Of the two parts, the material which did not undergo heat treatment had the highest flux rate, but also the highest rate of molybdenum loss.

A second portion also consisting of 120 gm of the above mixture. This was treated with aqueous ammonium hydroxide to a pH of 7.0. The alkalization required 12.95 gm of concentrated aqueous ammonium hydroxide (i.e., a ratio of molybdenum oxide to ammonium hydroxide of 0.82). This solution was subsequently divided into two parts. The first part was heated to 100° C. for 2 minutes and then air cooled and diafiltered. The diafiltration process resulted in the removal of 4 equivalent volumes of permeate. This was clear permeate, indicative of no loss of molybdenum. The retentate had a pH of 6.8 and conductance of 2920 umhos/cm. Again, diethylaminoethanol was used to alkalize the retentate to a pH of 10.0 with the resulting conductance of 3190 umhos/cm.

The second part was directly diluted and diafiltered without heating. The diafiltration removed 11.5 equivalent volumes of permeate which had a light gold color. The retentate thus formed had a pH of 5.75 and a conductance of 829 umhos/cm. Diethylaminoethanol was used to alkalize the retentate to a pH of 10.0. The resulting conductance was 2030 umhos/cm.

A third portion of the above mixture (120 gm) was heated to 100° C. for 2 minutes. This portion was divided into two parts. The first part was diluted and diafiltered, removing approximately 30 equivalent volumes of permeate. The resulting retentate had a pH of 3.25 and a conductance of 76.2 umhos/cm. However, the permeate had a dark amber color and indicated approximately 80% loss of molybdenum. The second part of this portion was air cooled and treated with ammonium hydroxide to a pH of 7.0. This required 6.27 gm of concentrated aqueous ammonium hydroxide (i.e., molybdenum oxide to ammonium hydroxide ratio of 1.7). Diafiltration of this material removed 10 equivalent volumes of permeate which was highly colored. The resulting retentate was unstable, and therefore no further work was done on it.

The Methods of Producing the Stable Metal Oxide Sols

The method of producing the stable acidic metal oxide sols of this invention comprises hydrolyzing a precursor metal compound in water containing a metal oxide sol stabilizing amount of a water-soluble stabilizing component chosen from the group consisting of water-soluble nonionic and anionic surfactants having an HLB greater than 8.0, water-soluble dispersing carboxylate polymers, and mixtures thereof, to form an impure acidic metal oxide sol containing extraneous hydroxylate ions, then removing the extraneous hydroxylate ions from the impure acidic metal oxide sol, thereby forming a stable acidic metal oxide sol.

The precursor metal compounds are chosen from the group consisting of hydrolyzable compounds of the alkaline earth metals, tin, aluminum, iron, zirconium, antimony, titanium, vanadium, chromium, manganese, cobalt, nickel, copper, zinc, molybdenum, lead, silver, platinum, mercury, and palladium. The preferred precursor metal compounds are chosen from the group consisting of hydrolyzable compounds of titanium, iron, tin, zirconium, aluminum, amtimony, and molybdenum.

The water-soluble stabilizing components are those described above and are primarily chosen from the group consisting of water-soluble anionic surfactants having an HLB greater than 8.0, water-soluble dispersible carboxylate polymers, and mixtures thereof wherein the stabilizing component is present at a ratio to metal oxide between 0.25:1 to about 20:1.

The method of producing stable alkaline metal oxide sols comprises:
(a) hydrolyzing a precursor metal compound in water containing a metal oxide sol stabilizing amount of a water-soluble stabilizing component chosen from the group consisting of water-soluble nonionic and anionic surfactants having an HLB greater than 8.0, water-soluble dispersing carboxylate polymers, and mixtures thereof, to form an impure acidic metal oxide sol containing extraneous hydrolysate ions, and then
(b) removing the extraneous hydrolysate ions from the impure acidic metal oxide sol to form a stable acidic metal oxide sol, and then
(c) alkalyzing the stable acidic metal oxide sol by adding a water-soluble amine thereto to achieve a pH of at least 8.0, thereby forming a stable alkaline metal oxide sol.

In the above process, a separate step is required to remove the extraneous hydrolysate ions formed in the original reaction between the precursor metal compound and the water ingredients causing its hydrolysis. In this hydrolysis step, these hydrolysate ions are formed at the same time that the metal oxide sol is formed—leading to an impure metal oxide sol. These hydrolysate ions can be removed conveniently by any of a number of processes including, but not limited to, ultrafiltration, diafiltration (which is an ultrafiltration process in which the retentate volume is maintained throughout the ultrafiltration), ion exchange, decantation following centrifugation, and simple membrane dialysis.

The preferred method of forming and producing stable alkaline metal oxide sols includes the choice of precursor metal compounds from the group consisting of hydrolyzable compounds of titanium, iron, tin, zirconium, aluminum, antimony, and molybdenum and wherein the water-soluble stabilizing component is chosen from the group consisting of anionic surfactants having an HLB greater than 8.0, water-soluble dispersing carboxylate polymers, and mixtures thereof. The alkalizing agents used to alkalize the stable acidic metal oxide sol are chosen from the group consisting of diethanolamine, ethanolamine, ethylenediamine, tetraethylenediamine, hexamethylene tetramine, diethylaminoethanol, and aminoethylethanolamine.

Utility

The metal oxide sols of this invention are useful in a variety of industrial applications. Some are useful to form coating compositions, some are useful in the production of petroleum catalysts, some are useful in producing electronic magnetic tape devices and electrically conductive coatings for a variety of substrates, while others may be used as additives for drilling muds. The processes of this invention provide 2 new metal oxide sol compositions. The first is a stable acidic metal oxide sol containing from 1–50 weight percent metal oxide. To achieve this stability and high concentration, a water-soluble stabilizing component selected from the group consisting of nonionic and anionic water-soluble surfactants having an HLB greater than 8, water-soluble dispersing carboxylate polymers having a molecular weight in the range of 1000–500,000, and mixtures thereof are added during the formation of the metal oxide sol at a ratio of metal oxide to water-soluble stabilizing component within the range of 0.25:1 to about 20:1. Of the above exemplified metal oxide sols, the stable metal oxide sol is preferably an alkaline stabilized metal oxide sol where the alkaline sol is achieved by adding an alkalizing agents which is a water-soluble amine to the acidic metal oxide sol formed in the presence of the water-soluble stabilizing components. This water-soluble amine alkalizing agent is preferably chosen from the group consisting of diethylamino ethanol, ethylenediamine and aminoethyl ethanolamine. The most preferred stable alkaline metal oxide sols are those wherein the metal oxide is chosen from the group consisting of titania, tin oxide, zirconia, iron oxide, alumina, and molybdenum oxide. The metal oxides above are preferably alkalized after their formation in the presence of a nonionic or anionic surfactant having an HLB of at least 8.0 admixed with a dispersing carboxylate polymer. The alkalizing agent is preferably a water-soluble amine chosen from the group consisting of diethylamino ethanol, ethylenediamine, hexamethylene tetramine, and aminoethyl ethanolamine.

Most metal oxide sols described in the prior art are acidic in nature so as to maintain some degree of stability. However, even these low pH metal oxide sols may be metastable and form gels or precipitates on long-term standing. In order to produce either acidic or alkaline metal oxide sols of sufficient stability to render the materials commercially attractive, the practices of this invention must be followed. The acidic sols described above have a pH between 1.5-3.5 and are stable for long periods of time when they contain the water-soluble stabilizing components described above in the ratios described above.

The finished alkaline stable metal oxide sols of this invention are indeed unique since, for the first time, it is possible to routinely achieve these alkaline metal oxide sols having a pH of at least 8.0 and, preferably, a pH between 9.0-12.5. As indicated in the prior art, attempts to adjust the pH of metal oxide sols originally made through acidic hydrolysis of precursor metal salts essentially resulted in instant gellation, precipitation and instability. The stable aqueous alkaline metal oxide sols are characterized as containing from 1-50 weight percent metal oxide, a water-soluble stabilizing component selected from the group consisting of nonionic or anionic water-soluble surfactants having an HLB greater than 8, water-soluble dispersing carboxylate polymers, and mixtures thereof with the ratio of metal oxide to stabilizing component being within the range of 0.25:1 to about 20:1. These alkaline sols have a pH of at least 8.0, preferably 9.0-12.5, and this alkaline pH is achieved by alkalizing the originally formed acidic stabilized metallic oxide sol by the addition thereto of the water-soluble amines previously described.

Having thus described my invention, I claim:

1. A stable alkaline metal oxide sol having a pH of at least 8.0 containing from 1-50 weight percent $M_xO_y$, wherein:

M is chosen from the group consisting of alkaline earth metals and transition metals;
x is from 1-3;
y is from 1-6; and a water-soluble stabilizing component chosen from the group consisting of water-soluble surfactants having an HLB greater than about 8.0, water-soluble dispersing carboxylate polymers and mixtures thereof, with the ratio of metal oxide to stabilizing component being within the range of 0.25:1 to about 20:1 and the pH of the alkaline metal oxide sol being produced by a water-soluble amine.

2. The stable alkaline metal oxide sol of claim 1 wherein the water-soluble stabilizing component is a water-soluble dispersing carboxylate polymer.

3. The stable alkaline metal oxide sol of claim 1 wherein the water-soluble stabilizing component is an anionic surfactant having an HLB greater than about 8.0.

4. The stable alkaline metal oxide sol of claim 1 wherein the water-soluble stabilizing component is a mixture of a water-soluble dispersing carboxylate polymer and an anionic surfactant having an HLB greater than about 8.0.

5. The stable alkaline metal oxide sol of claim 1 wherein M is chosen from the group consisting of berylium, magnesium, calcium, strontium, and barium.

6. The stable alkaline metal oxide sol of claim 1 wherein M is chosen from the group consisting of titanium, vanadium, chromium, manganese, iron, cobalt, nickel, copper, and zinc.

7. The stable alkaline metal oxide sol of claim 1 wherein M is chosen from the group consisting of zirconium, molybdenum, tin, and antimony.

8. The stable alkaline metal oxide sol of claim 1 wherein the water-soluble amine is chosen from the group consisting of methylamine, dimethylamine, trimethylamine, ethylamine, diethylamine, triethylamine, n-propylamine, di-n-propylamine, tri-n-propylamine, n-butylamine, n-amylamine, trimethylenediamine, tetramethylenediamine, pentamethylenediamine, hexamethylenediamine, hexamethylenetetramine, ethanolamine, diethylaminoethanol, ethylene diamine, and aminoethylethonalamine.

9. The stable alkaline metal oxide sol of claim 1 wherein the water-soluble amine is chosen from the group consisting of diethylaminoethanol, ethylene diamine, and aminoethylethanolamine.

10. The stable alkaline metal oxide sol of claim 6 wherein the water-soluble amine is diethylaminoethanol.

11. The stable alkaline metal oxide sol of claim 1 wherein the metal oxide is chosen from the group consisting of titania, tin oxide, zirconia, iron oxide, alumina, and molybdenum oxide, and the water-soluble amine is chosen from the group consisting of diethylaminoethanol, ethylenediamine, hexamethylene tetramine, and aminoethylethanolamine.

* * * * *